US012783915B2

(12) United States Patent
Schuff et al.

(10) Patent No.: US 12,783,915 B2
(45) Date of Patent: Nov. 3, 2026

(54) DEVICE AND METHOD FOR DETERMINING A KNOWLEDGE GRAPH

(71) Applicant: Robert Bosch GmbH, Stuttgart (DE)

(72) Inventors: Hendrik Schuff, Leonberg (DE); Heike Adel-Vu, Stuttgart (DE); Ngoc Thang Vu, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1184 days.

(21) Appl. No.: 17/241,759

(22) Filed: Apr. 27, 2021

(65) Prior Publication Data

US 2021/0342717 A1 Nov. 4, 2021

(30) Foreign Application Priority Data

Apr. 30, 2020 (DE) ........................ 102020205534.3

(51) Int. Cl.
*G06N 5/04* (2023.01)
*G06N 5/02* (2023.01)
*G06N 20/00* (2019.01)

(52) U.S. Cl.
CPC ................ *G06N 5/04* (2013.01); *G06N 5/02* (2013.01); *G06N 20/00* (2019.01)

(58) Field of Classification Search
CPC ............ G06N 5/04; G06N 5/02; G06N 20/00
See application file for complete search history.

(56) References Cited

U.S. PATENT DOCUMENTS 11,132,994 B1 * 9/2021 Zhou ...................... G06F 40/30
2019/0080225 A1 * 3/2019 Agarwal ................ G06F 18/22
2019/0220524 A1 * 7/2019 Costabello ........ G06F 16/24578
2021/0216880 A1 * 7/2021 Jin ...................... G06F 18/2163
2022/0121966 A1 * 4/2022 Wu ........................ G06F 16/36

FOREIGN PATENT DOCUMENTS

| | | | |
|---|---|---|---|
| CN | 108694469 | A | 10/2018 |
| CN | 108875051 | A | 11/2018 |
| CN | 110309281 | A | 10/2019 |
| CN | 110765788 | A | 2/2020 |
| JP | 2019101995 | A | 6/2019 |
| WO | 2019220128 | A1 | 11/2019 |

OTHER PUBLICATIONS

Ma et al., "Jointly Learning Explainable Rules for Recommendation With Knowledge Graph," IW3C2 (International World Wide Web Conference Committee), 2019, pp. 1210-1221.

* cited by examiner

*Primary Examiner* — Beau D Spratt
*Assistant Examiner* — Amy P Hoang
(74) *Attorney, Agent, or Firm* — NORTON ROSE FULBRIGHT US LLP

(57) ABSTRACT

A device and a method for determining a knowledge graph, including: providing a first entity for the knowledge graph; providing a text body; providing input data for a model that are defined as a function of the text body and the first entity of the knowledge graph; determining a prediction for a second entity and a prediction for a relationship for a triple for the knowledge graph, and a prediction for an explanation for the triple using the model as a function of the input data; determining a first probability that the model assigns to the triple and a second probability that the model assigns to the prediction for the explanation; determining a classification for the triple as a function of the first probability and of the second probability.

12 Claims, 2 Drawing Sheets

DEVICE AND METHOD FOR DETERMINING A KNOWLEDGE GRAPH

CROSS REFERENCE

The present application claims the benefit under 35 U.S.C. § 119 of German Patent Application No. 102020205534.3 filed on Apr. 30, 2020, which is expressly incorporated herein by reference in its entirety.

FIELD

The present invention is directed to a device and a method for determining a knowledge graph.

BACKGROUND INFORMATION

In knowledge-based systems, a knowledge graph is understood to mean a structured storage of knowledge in the form of a graph. Knowledge graphs include entities and represent relationships between entities. Entities define nodes of the knowledge graph. A relationship is defined as an edge between two nodes.

It is desirable to create a possibility of filling a knowledge graph automatically.

SUMMARY

This is achieved with the aid of a device and a method for determining a knowledge graph according to example embodiments of the present invention. The knowledge graph includes entities and relationships. The knowledge graph is, for example, defined by multiple triples of the form <entity 1, entity 2, relationship> the relationship of a triple defining the relationship between entity 1 and entity 2 of the triple. To determine the knowledge graph, a classification decision is made with the aid of a model for an entity 1, an entity 2, and a relationship, as to whether a triple of the form <entity 1, entity 2, relationship> exists and whether or not it is to be written into the knowledge graph.

In accordance with an example embodiment of the present invention, the method for determining a knowledge graph includes the steps: providing a first entity for the knowledge graph; providing a text body; providing input data for a model that are defined as a function of the text body and the first entity of the knowledge graph; determining a prediction for a second entity and a prediction for a relationship for a triple for the knowledge graph, and a prediction for an explanation for the triple with the aid of the model as a function of the input data; determining a first probability that assigns the model to the triple and a second probability that assigns the model to the prediction for the explanation; determining a classification for the triple as a function of the first probability and of the second probability, and if the classification meets one condition: determining the explanation as a function of the prediction for the explanation and of the triple for the knowledge graph as a function of the first entity, of the prediction for the second entity, and of the prediction for the relationship, a function being defined as a function of an in particular weighted sum of the first probability and of the second probability and at least one parameter being trained for the model depending on the function. The first probability indicates, how probable it is that the triple exists that includes the first entity, the predicted second entity, and the predicted relationship. The second probability indicates, how probable it is that the predicted explanation is applicable to the triple. In the present example, the triple is consequently only input into the knowledge graph, if the triple exists based on the first probability and the explanation is applicable based on the second probability. The explanation may be input or output together with the triple for the sake of better understanding the design of the knowledge graph. The function is used during training to determine the at least one parameter that minimizes the function in a gradient descent method, for example.

In one aspect of the present invention, the method includes providing the second entity and the relationship; determining a first cross entropy between the prediction for the second entity and the second entity; determining a second cross entropy between the prediction for the relationship and the relationship; determining an in particular weighted third cross entropy between the prediction for the explanation and the explanation, the function being defined as a function of a sum of the first cross entropy, the second cross entropy, the in particular weighted third entropy, and the in particular weighted sum of the first probability and the second probability. The function is a loss function that is minimized in a gradient descent method, for example, to determine the at least one parameter that minimizes the loss function.

Other measures that characterize the difference between two probability distributions may also be used instead of the cross entropies here and in the following, for example a Kullback-Leibler divergence or a different type of an f-divergence. A first measure that characterizes the difference between the prediction for the second entity and the first entity and a second measure that characterizes the difference between the prediction for the relationship and the relationship are advantageously provided by the same measure.

Training data may be provided for a training, the training data including a plurality of pairs of a triple and an explanation assigned to the triple, the model including a classifier that is trained as a function of the training data for the purpose of determining for the first entity from triple the prediction for the relationship and the prediction for the explanation for the triple.

In one aspect, a vector representation that defines at least a portion of the input data is determined for at least one word or for at least one sentence of the text body, in particular as a function of at least one other word or as a function of at least one other sentence. For example, a contextual vector representation that is a function of the other sentences of the text body as well as of the first entity is determined for every word and every sentence.

A first vector is preferably assigned to a first word from a sentence from the text body, a second vector being assigned to a second word from the sentence of the text body, the vector representation being computed as a weighted sum of the first vector and the second vector.

An output including the triple is preferably output at a first output of the model. In the present example, the output defines the triple that includes the provided first entity, the prediction for the second entity, and a predicted relationship between these entities.

In one aspect of the present invention, an output that defines a start and an end of at least one section in the text body is output at a second output of the model. In the present example, the explanation is actually an excerpt from the text.

The prediction for the second entity, the prediction for the relationship or the prediction for the explanation is preferably defined by a value of a distribution of values across a plurality of vectors. The model depicts the input data to values that indicate for each of the vectors their respective suitability for the determination of the knowledge graph or the explanation.

Metadata that are assigned to a triple in the knowledge graph are preferably determined as a function of the prediction for the explanation or as a function of the explanation. Metadata are suitable in particular as explanations of the reasons for obtained triples.

The classification preferably meets the condition, if the first probability exceeds a first threshold value and if the second probability exceeds a second threshold value.

In accordance with an example embodiment of the present invention, a device is provided for determining a knowledge graph is designed to carry out the method.

Further advantageous specific embodiments result from the following description and the figures.

DETAILED DESCRIPTION OF EXAMPLE EMBODIMENTS

Figure 1:
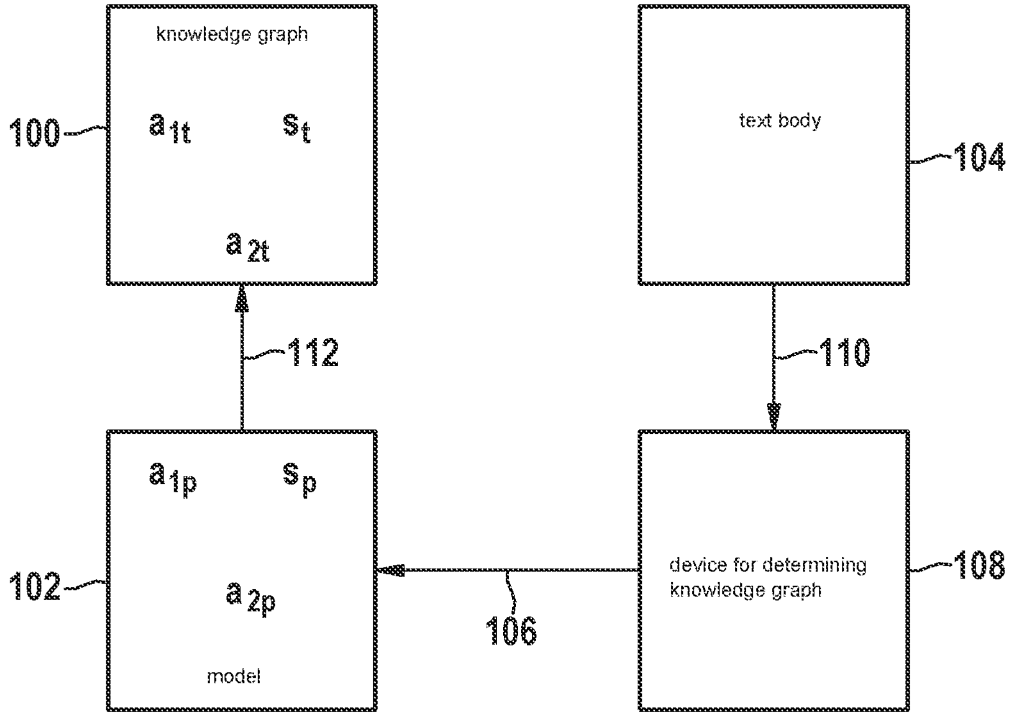
FIG. 1 shows a schematic illustration of a device for determining a knowledge graph, in accordance with an example embodiment of the present invention.

In FIG. 1, knowledge graph 100 is schematically illustrated. Knowledge graph 100 is definable by a plurality of entities. A first entity $a_{1t}$ and a second entity $a_{1t}$ are schematically illustrated in FIG. 1.

Knowledge graph 100 is determinable as a function of a model 102. To determine knowledge graph 100, a text body 104 is provided. Input data 106 for model 102 are provided by a device 108 for determining knowledge graph 100. In the present example, text body 104 is a text collection or a document collection. Starting from text body 104, embeddings 110 are generated by the device as vectors, for example, for individual words or sentences. In the present example, input data 106 include embeddings 110 for the text body and for the first entity. In the present example, the vectors are embeddings. The embeddings of an entity or relationship of knowledge graph 100 as well as of text body 104 shows a representation of the multidimensional entity in a low dimensional vector space, for example, as compared thereto.

Device 108 includes one or multiple processor(s) and at least one memory for instructions and is designed to carry out a method described in the following. In the present example, model 102 is designed to determine triple 112 for knowledge graph 100 and includes the first entity, a second entity $a_{1t}$, and their relationship $a_{1t}$.

Figure 2:
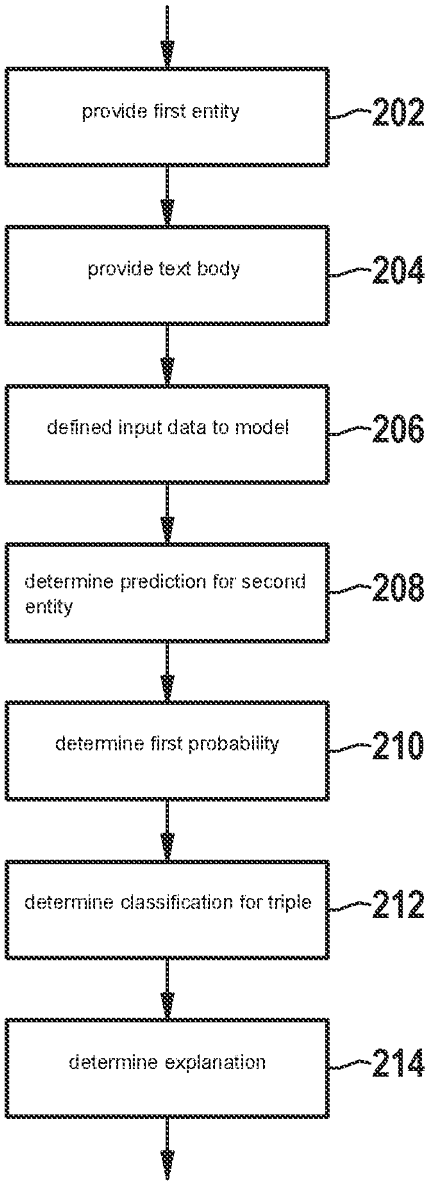
FIG. 2 shows steps in a method for determining the knowledge graph, in accordance with an example embodiment of the present invention.

With reference to FIG. 2, steps in a method are described for determining the knowledge graph.

In a step 202, the first entity of knowledge graph 100 is provided. The first entity may be selected from a plurality of entities from an already defined knowledge graph 100. The first entity may be predefined by a user via an input.

In a step 204, text body 104 is provided. Text body 104 is read from a database, for example.

In a step 206, input data 106 that are defined as a function of text body 104 and the first entity of knowledge graph 100 are provided to model 102. In the present example, input data 106 of model 102 are defined by the embeddings of text body 104, in particular of the document collection or text collection, and by an embedding of the first entity.

The first entity and text body 104 are represented by word vectors as embeddings, for example.

Every word from the first entity and text body 104 is assigned a word vector in an n-dimensional vector space, for example.

Every sentence from text body 104 is assigned a sentence vector in an n-dimensional vector space, for example. The dimensions of the vector spaces may also be identical.

For example, a contextual vector representation that is a function of the other words of text body 104 is for example computed for every word and/or sentence of text body 104. A contextual word representation is determined by a model, for example, which computes a word representation as a weighted sum of the representations of the surrounding words.

In a step 208, a prediction $a_{1p}$ for second entity $a_{1t}$ is determined with the aid of model 102 as a function of input data 106.

In step 208, a prediction $a_{2p}$ for a relationship $a_{2t}$ between the first entity and second entity $a_{1t}$ is determined with the aid of model 102 as a function of input data 106.

For example, a word vector for text body 104 is classified to the effect as to whether it represents or is part of second entity $a_{1t}$. Prediction $a_{1p}$ for second entity $a_{1t}$ defines, for example, a specific word vector, i.e., a specific word. Model 102 determines at an output, for example, a value for the word vectors from the n-dimensional vector space. These values for the word vectors form a value distribution across the word vectors, i.e., words of text body 104. The value distribution may be depicted by a softmax function on a probability distribution. Prediction $a_{1p}$ defines, for example, the word vector, i.e., the word, which has the highest value as compared to other predictions for other word vectors, as second entity $a_{1t}$, i.e., as part of triple 112. Multiple word vectors, i.e., words, may be assigned to a second entity $a_{1t}$, the word vectors, i.e., words, being determined as part of second entity $a_{1t}$, whose value for the prediction exceeds a threshold value.

A plurality of word vectors from a sentence from text body 104 is, for example, classified to the effect, as to what relationship the sentence includes between the first entity and second entity $a_{1t}$. This relationship defines prediction $a_{2p}$ for relationship $a_{2t}$, for example. Model 102 determines at the output values for possible relationships, for example. These values form a value distribution across possible relationships. The value distribution may be depicted by a softmax function on a probability distribution. Prediction $a_{2p}$ for relationship $a_{2t}$ is defined by the relationship to the highest value as compared to other possible relationships, for example. This is the one used in the present example as part of triple 112. The relationship, whose value exceeds a threshold value, may also be determined.

In the present example, the first entity, second entity $a_{1t}$, and relationship $a_{2t}$ define triple 112 for knowledge graph 100, if it is established, as described in the following, that triple 112 and an applicable explanation for same exist.

In step 208, a prediction $s_p$ for an explanation $s_t$ is determined with the aid of model 102 as a function of input data 106.

For example, a sentence vector form text body 104 is classified to the effect, as to whether it is relevant as an explanation $s_t$. Model 102 determines at an output a value for the sentence vectors from the m-dimensional vector space. These values form a value distribution across the sentence vectors, i.e., sentences of text body 104. The value distribution may be depicted by a softmax function on a probability distribution. Prediction $s_p$ defines for example the sentence vector, i.e., the sentence, as having the highest value as compared to other predictions for other sentence vectors as explanation $s_t$ for the triple. Multiple sentence vectors, i.e., sentences, may be assigned to an explanation $s_t$, the sentence vectors, i.e., sentences, being determined as part of explanation $s_t$, whose value for the prediction exceeds a threshold value.

Prediction $s_p$ for explanation $s_t$ or explanation $s_t$ may define metadata that may be assigned to triple 112 in knowledge graph 100. The metadata may identify the section of text body 104 or include a copy of the section or of parts of the section of text body 104.

In the present example, an output that includes triple 112, i.e., the first entity, prediction $a_{1p}$ for second entity $a_{1t}$, and prediction $a_{2p}$ for relationship $a_{2t}$, is output at a first output of model 102.

In the present example, an output that defines a start and an end of at least one section in text body 104 is output at a second output of model 102. In the present example, the output is defined by prediction $s_p$ for explanation $s_t$. Prediction $s_p$ for explanation $s_t$ defines, for example, the start and the end of the at least one section in text body 104. In the present example, prediction $s_p$ defines an offset for the start and the end of the section.

Text body 104 is represented by a matrix, for example. A column of the matrix represents a word vector, for example. The word vectors are situated in the matrix in the same order as the words in the text, for example. An index of the column in the matrix unambiguously identifies a word in the present example. The second output is a start offset and an end offset, for example. The start offset is, for example, a value for the index in the matrix that unambiguously indicates the position of the word in the text, at which the explanation starts. The end offset is, for example, a value for the index in the matrix that unambiguously indicates the position of the word in the text, at which the explanation ends. The explanation is defined within the model as a vector or submatrix, for example, i.e., as an embedding of the section. The start and the end are integer values for the particular offset in the text, for example.

In a step 210, a first probability $p_{correct\_answer}$ is determined that model 102 assigns to triple 112:

$$p_{correct_{answer}} = \text{softmax}(a_{1p}) * \text{softmax}(a_{2p})$$

First probability $p_{correct\_answer}$ may be a function of the product of the value of prediction $a_{1p}$ for second entity $a_{1t}$ and the value of prediction $a_{2p}$ for relationship $a_{2t}$. In the present example, the product of the probability value of prediction $a_{1p}$ for second entity $a_{1t}$ and the probability value of prediction $a_{2p}$ for relationship $a_{2t}$ is determined.

In step 210, a second probability $p_{qt\_explanation}$ is determined that model 102 assigns to prediction $s_p$ for explanation $s_t$.

$$p_{gt\_explanation} = \pi \text{softmax}(s_p)$$

Second probability $p_{qt\_explanation}$ may be determined as a function of the product of the values, of the probability values in the present example, which for prediction $s_p$ for explanation $s_t$ for triple 112 model 102 has determined. In the present example, second probability $p_{gt\_explanation}$ is determined for the sentence vectors that are part of prediction $s_p$ for explanation $s_t$.

In a step 212, a classification for triple 112 is determined as a function of first probability $p_{correct\_answer}$ and of second probability $p_{qt\_explanation}$.

In the present example, triple 112 is relevant for knowledge graph 100, if the classification meets one condition.

The classification meets the condition, for example, if first probability $p_{correct\_answer}$ exceeds a first threshold value and if second probability $p_{qt\_explanation}$ exceeds a second threshold value.

For a combination of the output for triple 112 and the explanation, there are the following four cases for the classification:

- triple 112 is correct and the explanation is correct
- triple 112 is correct, but the explanation is incorrect
- triple 112 is incorrect, but the explanation is correct (in this case, correct in the sense of: correct for the correct output)
- triple 112 is incorrect and the explanation is incorrect.

In the present example, the first threshold value and the second threshold value are defined for probability values in the range of 0 and 1, for example 0.8 or 0.9. The first threshold value and the second threshold value may also be defined by other values. The first threshold value and the second threshold value may also be defined by values that are different from one another.

First probability $p_{correct\_answer}$ is a measure for the fact that the output is correct triple 112 and second probability $p_{qt\_explanation}$ is a measure for the fact that the explanation is correct for the output. The classification meets the condition in the first case. The classification does not meet the condition in the last three cases.

In a step 214, the explanation is determined as a function of prediction $s_p$ for the explanation and triple 112 for knowledge graph 100 as a function of the first entity, prediction $a_{1p}$ for second entity $a_{1t}$, and prediction $a_{2p}$ for relationship $a_{2t}$, if the classification meets the condition. In the present example, an input is determined in knowledge graph 100 including triple 112, if the classification meets the condition.

In the present example, triple 112 is input, if first probability $p_{correct\_answer}$ exceeds the first threshold value and second probability $p_{qt\_explanation}$ exceeds the second threshold value. Otherwise, triple 112 is discarded in the present example. Subsequently, step 202 may be carried out for the same or another first entity.

In this way, the knowledge graph is built in iterations.

Figure 3:
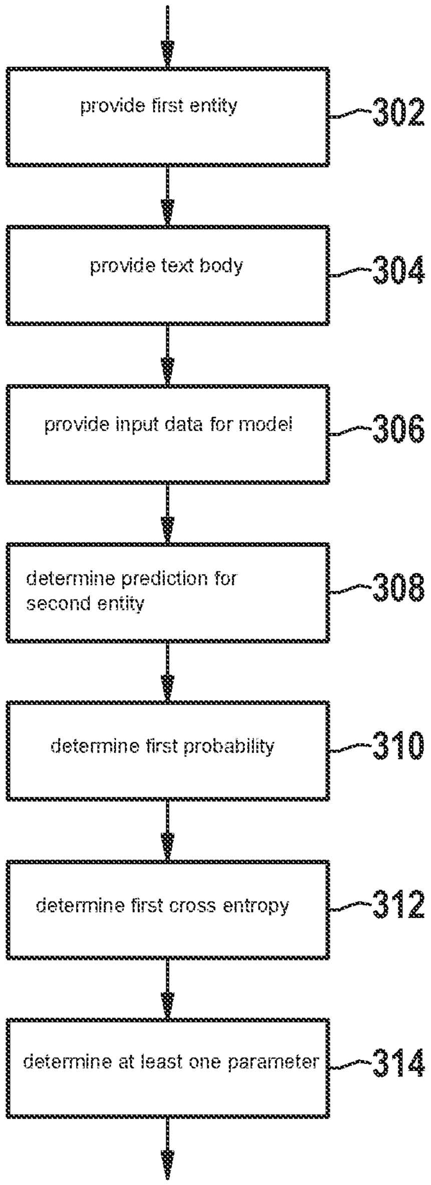
FIG. 3 shows steps in a method for training a model for determining the knowledge graph, in accordance with an example embodiment of the present invention.

With reference to FIG. 3, the steps in a method are described for training model 102 for determining knowledge graph 100.

In a step 302, the first entity of knowledge graph 100 is provided. In a step 302, a second entity $a_{1t}$ of knowledge graph 100 is provided. In the present example, these are training data, whose relationship $a_{2t}$ with one another is known. In step 302, an explanation $s_t$ is provided. These are the metadata of an applicable explanation $s_t$, for example.

In a step 304, text body 104 is provided. The text body is advantageously a text body 104, for which the metadata of an applicable explanation $s_t$ for relationship $a_{2t}$ of the first entity and second entity $a_{1t}$ are known.

In a step 306, input data 106 for model 102 are provided. For this purpose, it is proceeded as described in step 206, for example.

In a step 308, a prediction $a_{1p}$ for second entity $a_{1t}$ is determined with the aid of model 102 as a function of input data 106.

In step 308, prediction $a_{2p}$ for a relationship $a_{2t}$ between the first entity and second entity $a_{1t}$ is determined with the aid of model 102 as a function of input data 106.

In step 308, prediction $s_p$ for an explanation $s_t$ is determined with the aid of model 102 as a function of input data 106.

For this purpose, it is proceeded as described in step 208, for example.

In a step 310, first probability $p_{correct\_answer}$ is determined that model 102 assigns to correct triple 112 known in training.

For this purpose, first probability $p_{correct\_answer}$ is determined, $P_{correct\_answer}$=softmax($a_{1t}$)*softmax($a_{2t}$)) indicating the probability that model 102 assigns, as described in step 210, to the correct combination of second entity $a_{1t}$ and relationship $a_{2t}$ known in training.

In step 310, second probability $p_{qt\_explanation}$ is determined that model 102 assigns to explanation $s_t$ known in training.

For this purpose, second probability $p_{qt\_explanation}$ is determined in the present example, [equation] indicating the probability that model 102 assigns, as described in step 210, to all relevant explanations under the assumption that these are independent from one another.

In a step 312, a first cross entropy $CE_1$ between prediction for the second entity $a_{1p}$ and second entity $a_{1t}$ is determined. In step 312, a second cross entropy $CE_2$ between prediction $a_{2p}$ for the relationship and relationship $a_{2t}$ is determined. In step 312, a third cross entropy $CE_3$, which is in particular weighted with a factor $\lambda_{sp}$, is determined between prediction $s_p$ for explanation $s_t$ and explanation $s_t$.

In a step 314, at least one parameter, for which a function J meets one condition, is determined for model 102. For example, a plurality of values for function J is determined as a function of a plurality of parameters, function J meeting the condition for that extremal value of the plurality of parameters, in particular the smallest of these values as compared to the others. Function J is a loss function that is defined as a function of first probability $p_{correct\_answer}$ and of second probability $p_{qt\_explanation}$. In the present example, loss function J is defined as a function of a sum of first cross entropy $CE_1$, second cross entropy $CE_2$, in particular weighted $\lambda_{sp}$ third cross entropy $CE_3$, and in particular weighted $\lambda_{cc}$ sum of first probability $p_{correct\_answer}$ and of second probability $p_{qt\_explanation}$.

In the present example, the loss function is defined by a target function $J_{con}$ having further hyper parameters c1, c2, c3 for loss function J, which may be optimized:

$$J=CE_1)a_{1p},a_{1t})+CE_2(a_{2p},a_{2t})+\lambda_{sp}CE_3(s_p,s_t)+\lambda_{cc}J_{con}$$

where:

$$J_{con}=(p_{correct_{answer}}*(1-p_{gt_{explanation}}*c1)+c2*(1-p_{correct_{answer}})*(p_{gt_{explanation}})+c3*(1-p_{gt_{explanation}})$$

For the training, steps 302 through 314 are repeated using training data.

Training data are provided in particular, the training data including a plurality of pairs of a triple 112 and an explanation $s_t$ assigned to triple 112, model 102 including a classifier that is trained as a function of the training data for the purpose of determining for the first entity from triple 112 prediction $a_{2p}$ for relationship $a_{2t}$ and prediction $s_p$ for explanation $s_t$ for triple 112. The classifier may be an artificial neural network, in particular a deep artificial neural network. The artificial neural network includes for example an input layer for input data 106 and an output layer for the first output and the second output. A hidden layer or several hidden layers may be situated between the input layer and the output layer. The parameters of the layers are for example defined by the plurality of the parameters, for which function J meets the condition in training.

Applications are, for example, to be found within the scope of material classifications and are directed to building a knowledge database that includes all information about the materials and their relationships. These may be extracted from texts, relevant sentence parts, which were the reason for the extraction of the information, also being extracted as an explanation in addition to the information about the relationship.

What is claimed is:

1. A method for determining a knowledge graph, comprising the following steps:
- providing a first entity for the knowledge graph;
- providing a text body that includes a text collection or a document collection that includes a sentence;
- providing input data for a model that are defined as a function of the text body and the first entity of the knowledge graph;
- determining a prediction for a second entity, a prediction for a relationship for a triple for the knowledge graph, and a prediction for an explanation for the triple using the model as a function of the input data;
- determining a first probability that the model assigns to the triple and a second probability that the model assigns to the prediction for the explanation;
- determining a classification for the triple as a function of the first probability and of the second probability;
- when the classification meets a condition:
  - determining the explanation as a function of the prediction for the explanation and of the triple for the knowledge graph as a function of the first entity, of the prediction for the second entity, and of the prediction for the relationship, a function being defined depending on a weighted sum of the first probability and of the second probability and at least one parameter being trained for the model depending on the function, wherein the explanation is an excerpt from the text body;
- wherein training data are provided, the training data including a plurality of pairs of a triple and an explanation assigned to the triple, the model including a classifier that is trained as a function of the training data for determining for the first entity from the triple the prediction for the relationship and the prediction for the explanation for the triple; and
- wherein the prediction for the second entity, the prediction for the relationship or the prediction for the explanation is defined by a value of a distribution of values across a plurality of vectors.

2. The method as recited in claim 1, further comprising:
- providing the second entity and the relationship;
- determining a first measure, which characterizes a difference between two probability distributions, between the prediction for the second entity and the second entity;
- determining a second measure, which characterizes a difference between two probability distributions, between the prediction for the relationship and the relationship;
- determining a third measure, which characterizes a difference between two probability distributions, of a weighted third cross entropy between the prediction for the explanation and the explanation, the function being defined depending on the first measure, of the second measure, and of the third measure and of a weighted sum of the first probability and of the second probability.

3. The method as recited in claim 2, wherein the function is also defined depending on a sum of the first measure, the second measure, and the third measure.

4. The method as recited in claim 2, wherein:
the first measure is at least one from a cross entropy, a Kullback-Leibler divergence, and an f-divergence, and/or
the second measure is at least one from a cross entropy, a Kullback-Leibler divergence, and an f-divergence, and/or
the third measure is at least one from a cross entropy, a weighted cross entropy of a Kullback-Leibler divergence, and an f-divergence.

5. The method as recited in claim 2, wherein a vector representation that defines at least a portion of the input data is determined for at least one word of the text body or for at least one sentence of the text body, as a function of at least one other word or as a function of at least one other sentence.

6. The method as recited in claim 5, wherein a first vector is assigned to a first word from a sentence from the text body, a second vector is assigned to a second word from the sentence of the text body, the vector representation being computed as a weighted sum from the first vector and the second vector.

7. The method as recited in claim 2, wherein an output including the triple is output at a first output of the model.

8. The method as recited in claim 2, wherein an output that defines a start and an end of at least one section in the text body is output at a second output of the model.

9. The method as recited in claim 2, wherein metadata that are assigned to a triple in the knowledge graph are determined as a function of the prediction for the explanation or as a function of the explanation.

10. The method as recited in claim 2, wherein the classification meets the condition when the first probability exceeds a first threshold value and when the second probability exceeds a second threshold value.

11. A device including at least one processor that implements a machine learning model for determining a knowledge graph, the at least one processor of the device configured to:
provide a first entity for the knowledge graph;
provide a text body that includes a text collection or a document collection that includes a sentence;
provide input data for a model that are defined as a function of the text body and the first entity of the knowledge graph;
determine a prediction for a second entity, a prediction for a relationship for a triple for the knowledge graph, and a prediction for an explanation for the triple using the model as a function of the input data;
determine a first probability that the model assigns to the triple and a second probability that the model assigns to the prediction for the explanation;
determine a classification for the triple as a function of the first probability and of the second probability;
when the classification meets a condition:
determine the explanation as a function of the prediction for the explanation and of the triple for the knowledge graph as a function of the first entity, of the prediction for the second entity, and of the prediction for the relationship, a function being defined depending on a weighted sum of the first probability and of the second probability and at least one parameter being trained for the model depending on the function, wherein the explanation is an excerpt from the text body;
wherein training data are provided, the training data including a plurality of pairs of a triple and an explanation assigned to the triple, the model including a classifier that is trained as a function of the training data for determining for the first entity from the triple the prediction for the relationship and the prediction for the explanation for the triple; and
wherein the prediction for the second entity, the prediction for the relationship or the prediction for the explanation is defined by a value of a distribution of values across a plurality of vectors.

12. A non-transitory machine-readable storage medium on which is stored a computer program for determining a knowledge graph, the computer program, when executed by at least one processor that implements a machine learning model, causing the at least one processor to perform the following steps:
providing a first entity for the knowledge graph;
providing a text body that includes a text collection or a document collection that includes a sentence;
providing input data for a model that are defined as a function of the text body and the first entity of the knowledge graph;
determining a prediction for a second entity, a prediction for a relationship for a triple for the knowledge graph, and a prediction for an explanation for the triple using the model as a function of the input data;
determining a first probability that the model assigns to the triple and a second probability that the model assigns to the prediction for the explanation;
determining a classification for the triple as a function of the first probability and of the second probability;
when the classification meets a condition:
determining the explanation as a function of the prediction for the explanation and of the triple for the knowledge graph as a function of the first entity, of the prediction for the second entity, and of the prediction for the relationship, a function being defined depending on a weighted sum of the first probability and of the second probability and at least one parameter being trained for the model depending on the function, wherein the explanation is an excerpt from the text body;
wherein training data are provided, the training data including a plurality of pairs of a triple and an explanation assigned to the triple, the model including a classifier that is trained as a function of the training data for determining for the first entity from the triple the prediction for the relationship and the prediction for the explanation for the triple; and
wherein the prediction for the second entity, the prediction for the relationship or the prediction for the explanation is defined by a value of a distribution of values across a plurality of vectors.

* * * * *